United States Patent [19]
Ferla et al.

[11] Patent Number: 4,742,397
[45] Date of Patent: May 3, 1988

[54] SYSTEM AND METHOD FOR ADJUSTING IMAGE BRIGHTNESS IN ELECTRONIC PRINTER

[75] Inventors: Guillermo S. Ferla, Reading; Dean Gross, Boston, both of Mass.

[73] Assignee: Polaroid Corporation, Cambridge, Mass.

[21] Appl. No.: 819,128

[22] Filed: Jan. 16, 1986

[51] Int. Cl.4 .............................................. H04N 5/76
[52] U.S. Cl. ...................................... 358/244; 315/10; 315/30; 354/76; 346/110 R; 358/168; 358/345
[58] Field of Search ................. 358/74, 168, 242, 243, 358/244–345; 315/10, 383, 30; 354/76, 123; 346/107 R, 110 R

[56] References Cited

U.S. PATENT DOCUMENTS

| | | | |
|---|---|---|---|
| 3,469,142 | 9/1969 | Bellemare | 315/30 |
| 3,471,740 | 10/1969 | Dreyfoos, Jr. et al. | 315/10 |
| 3,564,137 | 2/1971 | MacIntyre, Jr. et al. | 178/7.5 |
| 3,597,540 | 8/1971 | MacIntyre, Jr. | 178/7.3 R |
| 3,700,329 | 10/1972 | Mason | 355/81 |
| 4,027,315 | 5/1977 | Barney | 354/76 |
| 4,126,884 | 11/1978 | Shanley, II | 358/21 |
| 4,240,729 | 12/1980 | Barney | 354/76 |
| 4,415,921 | 11/1983 | Mulvanny et al. | 358/139 |
| 4,433,345 | 2/1984 | Haddick et al. | 358/244 |
| 4,438,453 | 3/1984 | Alston | 358/78 |
| 4,473,849 | 9/1984 | Cool | 358/332 |
| 4,530,011 | 7/1985 | Haddick | 358/244 |
| 4,631,576 | 12/1986 | St. John | 358/242 X |
| 4,679,087 | 7/1987 | Torrano, Jr. et al. | 358/345 X |

Primary Examiner—Robert L. Richardson
Attorney, Agent, or Firm—Edward S. Roman

[57] ABSTRACT

A system and method for displaying an image for photographic reproduction operates to calibrate the brightness of the image display prior to each photographic reproduction in a manner that accounts for the variations in the brightness characteristics of the images of different scenes to be photographically reproduced.

13 Claims, 3 Drawing Sheets

SYSTEM AND METHOD FOR ADJUSTING IMAGE BRIGHTNESS IN ELECTRONIC PRINTER

BACKGROUND OF THE INVENTION

1. Field of the Invention

This invention relates generally to a system and method for adjusting the brightness of an image to be photographically reproduced and, more particularly, to a system and method for adjusting the image brightness in a system in which the images are displayed for photographic reproduction.

2. Description of the Prior Art

Electronic image copiers which utilize a cathode ray tube to display an image to be photographically reproduced by exposing a photosensitive material to the display screen of the cathode ray tube are well known in the art. Such images to be photographically reproduced may be displayed on the cathode ray tube at conventional video frame rates. Full color reproductions may be made by using a monochromatic cathode ray tube to sequentially display the red, green and blue color separation video signals through filters in a way that synchronizes the color of the filter to the color of the video signal being displayed on the screen. Alternatively, a color cathode ray tube could be used to display the full color image for photographic reproduction. Regardless of the aforementioned technique utilized, the brightness of the cathode ray tube must be adjusted before each exposure to assure its correlation to the photosensitive characteristics of the film to be exposed. The brightness of a cathode ray tube for a given input voltage may vary considerably with time particularly during the warm-up period for the cathode ray tube which may extend for several minutes. Thus, it is necessary that the cathode ray tube be adjusted before each exposure so that for a given input voltage there is provided a select brightness on the display screen of the cathode ray tube which correlates to the light sensitivity characteristics of the photoresponsive material to be exposed. The adjustment of the cathode ray tube brightness to a select reference level, however, may not be sufficient to accommodate for the variation in brightness levels of the different images that may be displayed for photographic reproduction. Thus, depending upon the image scene brightness characteristics a satisfactory exposure still may not be provided despite the aforementioned brightness adjustment since there may still be an insufficient correlation between the scene brightness characteristics and the light sensitivity characteristics of the film to achieve a satisfactory photographic reproduction.

Therefore, it is a primary object of this invention to provide a system and method for adjusting the image brightness in a display from which a photographic reproduction is exposed which accounts for the variation in the brightness characteristics of different images.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An electronic printer is provided for displaying an image for photographic reproduction. The electronic printer comprises a display for visually displaying the image to be photographed. A photoresponsive element detects the intensity of light emanating from the display and provides an output signal corresponding to the intensity of the light so detected. A comparator operates to compare the output signal from the photoresponsive element with a select one of a plurality of different voltage reference signals to provide an output signal indicative of the comparisons so made. A control system operates to initially apply a steady state select voltage to the display in place of an image defining electronic information signal so that the display provides a substantially uniform light intensity across the face thereof. A control thereafter operates to adjust, if necessary, the light intensity of the display in response to the output of the comparator so that the light intensity of the display corresponds to the one select voltage reference signal. A control thereafter applies an image defining electronic information signal in place of the steady state select voltage to the display so that the display shows the image to be photographed. The control thereafter selects, if necessary, other ones of the plurality of different voltage reference signals until the output signal from the comparator meets a select condition. The control thereafter adjusts if necessary the light intensity of the display as a function of the different voltage reference signals previously selected. The display preferably comprises a cathode ray tube having a cathode and grid terminal wherein the control applies the steady state voltage and the image defining electronic information signal to the cathode terminal of the cathode ray tube. The control further adjusts the light intensity of the cathode ray tube by varying the grid voltage applied to the cathode ray tube.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
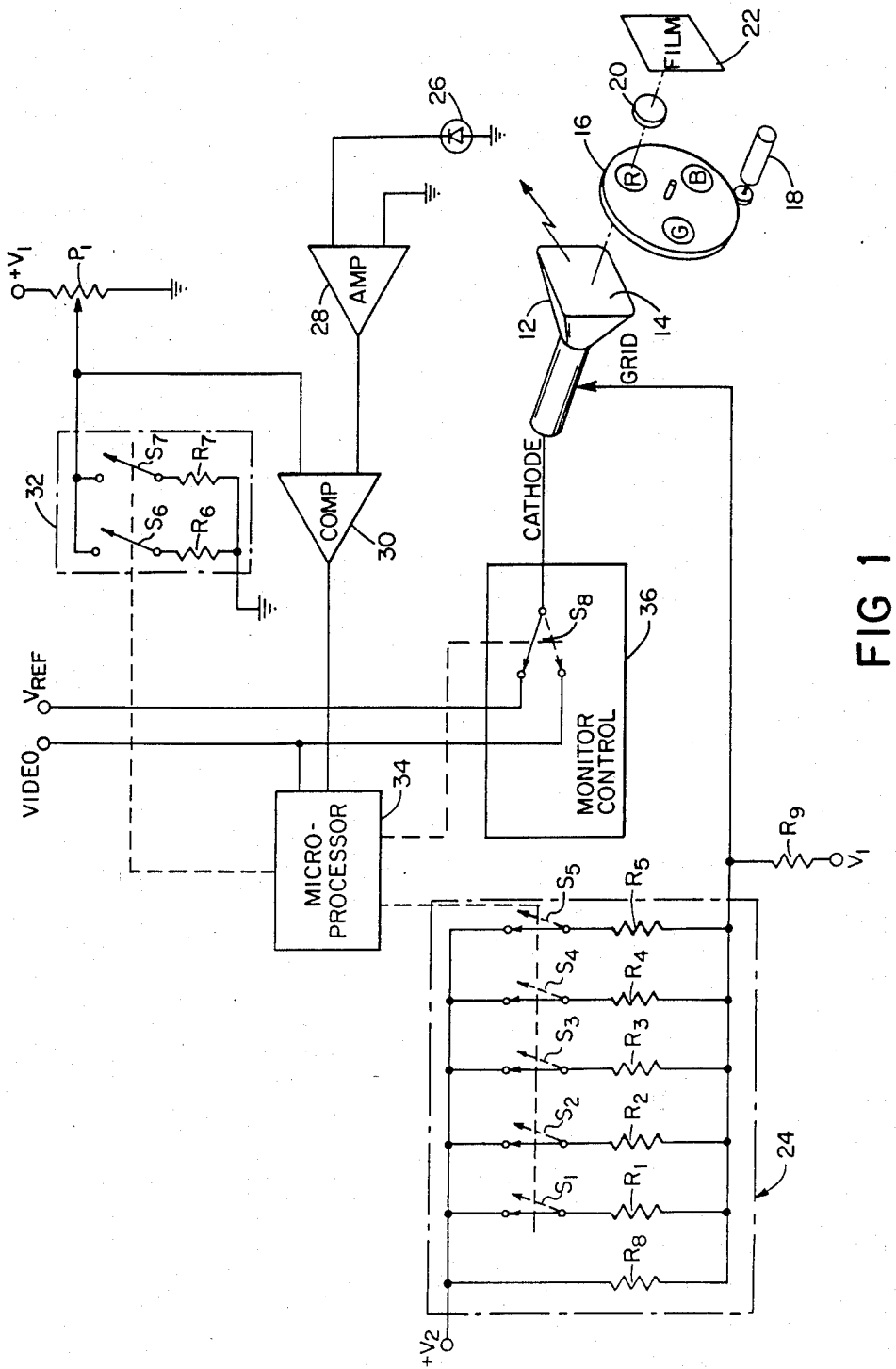
FIG. 1 is a schematic diagram for the electronic printer of this invention.

Referring now to FIG. 1, there is shown a schematic circuit diagram of the system of this invention for adjusting the image brightness in an electronic printer which displays images for photographic reproduction. The electronic image printer comprises a monochrome cathode ray tube 12 having a display screen 14 overlapped by a rotatably mounted filter wheel 16. The filter wheel 16, in turn, comprises the three primary red, green and blue color filters each one of which may be selectively moved into overlying relationship with respect to the display screen 14 by a motor drive 18. The light from the display screen 14 is transmitted through a selected one of the red, green and blue filters of the filter wheel 16 to a lens 20 from which it is imaged on the surface of a photosensitive material as shown at 22. As will be readily understood, the cathode ray tube 12, the filter wheel 16, the lens 20, and the photosensitive material 22 are all housed in a suitably lighttight chamber (not shown in the drawing). The motor 16, in turn, is controlled in a well-known manner in concert with the particular red, green or blue color separation video signal applied to the cathode ray tube 12 so that the appropriate one of the red, green and blue filters is moved into overlying relationship with respect to the display screen 14 to expose the photosensitive material 22 in a manner as is disclosed in U.S. Pat. No. 4,438,453, entitled "Constant Light Greyscale Generator For CRT Color Camera System", by L. Alston, issued Mar. 20, 1984, and now incorporated by reference herein.

The grid voltage applied to the cathode ray tube 12 is furnished from a positive voltage supply $V_2$ and a negative voltage supply $V_1$ by way of a resistor network shown generally at 24 and a resistor $R_9$, respectively. By way of example, the positive voltage supply $V_2$ may be 12 volts, the negative voltage supply $V_1$ may be $-100$ volts and resistor $R_9$ may be 100k ohms. The resistor network 24 comprises a plurality of resistors $R_1$, $R_2$, $R_3$, $R_4$ and $R_5$ connected in serial relation, respectively, with a plurality of switch contacts $S_1$, $S_2$, $S_3$, $S_4$ and $S_5$. The resistor network also preferably comprises another parallel connected resistor $R_8$. As is readily apparent, the voltage applied to the grid terminal of the cathode ray tube 12 may be varied by closing selected ones of the switch contacts $S_1$, $S_2$, $S_3$, $S_4$ and $S_5$ to achieve different parallel resistance combinations in the manner of this invention to be subsequently described. Although mechanical switch contacts are shown for purposes of illustration, it will be readily understood that electronic switches, i.e., transistors, would comprise the preferred switch elements. Resistors $R_1$, $R_2$, $R_3$, $R_4$ and $R_5$ may have typical values of 30k ohms, 62k ohms, 120k ohms, 240k ohms and 470k ohms, respectively, while resistor $R_8$ may have a typical value of 12k ohms.

Light emanating from the display screen 14 of the cathode ray tube 12 is detected by a photoresponsive diode 26 which provides an output signal corresponding to the average light intensity of the central portion of the display screen 14. The output signal from the photoresponsive element 26 is amplified by an amplifier 28 and thereafter directed to one input terminal of a comparator 30 for comparison with a select voltage reference signal applied to the other terminal of the comparator 30 and derived from a voltage supply $V_l$ by way of a potentiometer $P_1$ and a resistor network shown generally at 32. The resistor network 32 comprises resistors $R_6$ and $R_7$ connected, respectively, in serial relationship with switch contacts $S_6$ and $S_7$. Again, as is readily apparent, the select voltage reference signal applied to the comparator 30 may be varied by selectively switching the switch contacts $S_6$ and $S_7$ to achieve different combinations of parallel resistance. The output from the comparator 30, in turn, is directed to a microprocessor 34 which operates to control the closure of the switch contacts $S_l$ through $S_7$ in the manner of this invention to be subsequently described. Again, mechanical switch contacts are shown only for purposes of illustration and electronic switch components such as transistors would be preferred.

An image defining electronic information signal is applied to a video terminal and thereafter directed to the cathode terminal of the cathode ray tube 12 by way of a monitor control as shown at 36. The monitor control 36 includes a switch contact $S_8$ for switching the signal applied to the cathode of the cathode ray tube 12 between the image defining electronic information signal applied to the video terminal and a steady state select voltage reference level applied to the terminal $V_{ref}$. Closure of the switch contact $S_8$ is controlled by the microprocessor 34 in the manner of this invention to be herein described.

The system of this invention for adjusting the image brightness on the display screen 14 of the cathode ray tube 12 commences upon the microprocessor 34 providing the appropriate control signal to move switch contact $S_8$ to the solid line position as shown thereby applying the steady state voltage $V_{ref}$ to the cathode terminal of the cathode ray tube 12. The display screen 14 thus displays a full screen raster of generally uniform light intensity across the face thereof at standard video field rates. The light emanating from the display screen 14 is detected by the photodiode 26 which is center weighted to detect primarily the light emanating from the center portion of the display screen 14 and provide an output signal corresponding to the light so detected. The output signal from the photodiode 26, in turn, is amplified by the amplifier 28 and thereafter directed to one input terminal of the comparator 30. The amplified output signal for one vertical field is shown graphically at A in FIG. 2. The other input terminal to the comparator 30 receives one of a select plurality of different voltage reference signals which are determined in accordance with the positions of the switch contacts $S_6$ and $S_7$ and the adjustment of the potentiometer $P_1$. In the preferred embodiment the switch contacts $S_6$ and $S_7$ are initially opened as shown in solid lines and the potentiometer $P_1$ and voltage supply $V_1$ selected to provide a 1.5 volt reference voltage signal to the comparator 30 as shown graphically at B in FIG. 2.

Figure 2:
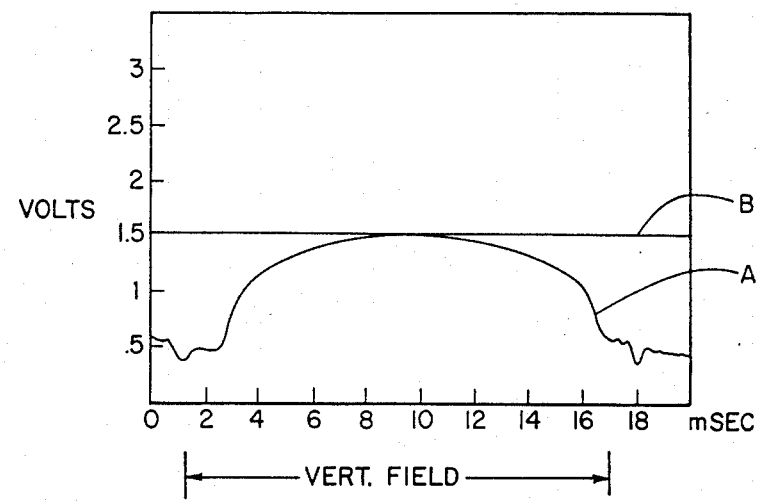
FIG. 2 is a graphical representation of certain electronic signals of the circuit of FIG. 1.

The microprocessor 34 interrogates the output signal from the comparator 30 at the middle of each vertical field to determine whether the appropriate grid voltage is being applied to the cathode ray tube 12. Referring to FIG. 2 it can be seen that the output signal A from the amplifier 28 at the center of the vertical field corresponds to the selected 1.5 volt reference voltage so that no further adjustment to the grid voltage of the cathode ray tube 12 should be required to control the brightness of the display screen 14. However, since the output from the comparator is the same regardless of whether the output signal A from the amplifier 28 is equal to or greater than the 1.5 volt reference voltage B, the microprocessor 34 cannot determine whether the brightness of the display screen 14 is set to the appropriate brightness level as determined by the 1.5 volt reference voltage or set to a brighter than desired level in comparison to the 1.5 volt reference voltage.

The microprocessor 34 therefore provides the appropriate control signal to switch one or more of the switch contacts $S_1$ through $S_5$ to effectively reduce the grid voltage applied to the cathode ray tube 12 and, in turn, decrease the intensity of the illumination emanating from the display screen 14. The light intensity from the display screen 14 detected by the photoresponsive element 26 thus decreases accordingly so as to provide a corresponding reduction in the amplitude of the output signal A. The comparator 30 responds to this reduction in the level of the output signal A to provide the appropriate signal to the microprocessor 34 that the value of the output signal A at the middle of the vertical field is less than the reference voltage B. Thus, the change in the output signal from the comparator 30 signals the microprocessor that the last incremental change in the resistance of the resistance network 24 resulted in the brightness of the display screen 14 decreasing across the selected level at which it is to be set to correspond to the select voltage reference B. In this manner the crossover point is determined for the adjustment of the grid voltage which controls the light intensity from the display screen 14 and no further switch contacts $S_1$ through $S_5$ are opened or closed.

Conversely, if upon the initial interrogation it is found that the output signal A from the amplifier 28 is less than the select voltage reference signal B, then the microprocessor 34 provides a control signal to switch one or more of the switch contacts $S_1$ through $S_5$ to increase the grid voltage applied to the cathode ray tube 12 and thereby increase the light intensity emanating from the display screen 14. Photodiode 26 thereafter measures the increased light intensity emanating from the display screen 14 and provides a corresponding output signal to the amplifier 28 which, in turn, amplifies the output signal A to the comparator 30. If the increase in light intensity from the display screen 14 is sufficient to cause the output signal A to increase above the value of the voltage reference signal B, then the output from the comparator 30 switches so as to signal the microprocessor 34 that the light intensity of the display screen 14 has crossed over the voltage reference signal B and no further change in the position of the switch contacts $S_1$ through $S_5$ is required.

The switch contacts Sl through S5 are arranged in a binary format and controlled by the microprocessor to close and/or open in select combinations for each incremental change in the light intensity of the display screen 14 which is thereafter detected by the photodetector 26 to determine whether the light intensity is crossed over with respect to the select voltage reference level B. The switch contacts of the network 24 that are opened and/or closed for each incremental resistance step are selected by the microprocessor 34 to effect the least significant change in resistance, which in our example is 470k ohms, thereby resulting in 32 different total steps of resistance to which the resistor network 24 may be switched by the microprocessor 34. Each step in resistance for the resistor network 24 results in a corresponding change of 1/10th of a stop in the exposure of the photosensitive material 22 by virtue of the incremental change in the light intensity of the display screen 14. Thus, as is now readily apparent, the resistive network may be switched through a plurality of succeeding resistive steps before the light intensity of the display screen 14 is increased or decreased sufficiently to effect a crossover in the output signal from the amplifier 28 relative to the select voltage reference signal B. Once the crossover is detected by the microprocessor 34, no further switching occurs within the resistor network 24 and the light intensity of the display screen 14 is adjusted to correspond to the select voltage reference signal B which for our example is initially 1.5 volts.

Figure 3A:
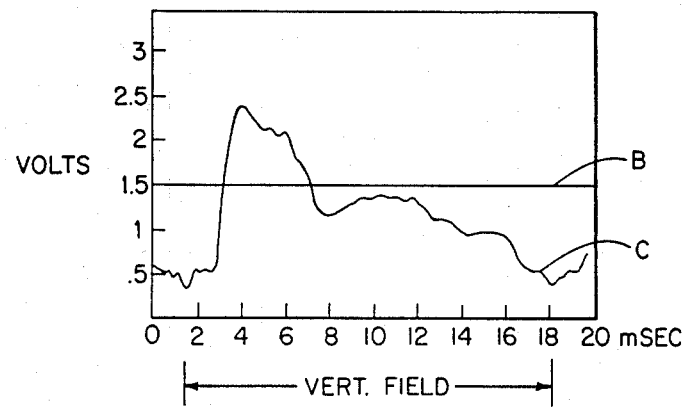
FIGS. 3A and 3B show graphical representations of different electrical signals for the circuit of FIG. 1.

Once the brightness of the display screen 14 has been adjusted in the aforementioned manner, the microprocessor 34 signals the monitor control 36 to switch the switch contact $S_8$ from its solid line position as shown to its phantom line position thereby applying an image defining electronic information signal from the video terminal to the cathode terminal of the cathode ray tube 12. The display screen 14 thereafter displays an image of the subject to be photographically reproduced on the photosensitive material 22, and the light intensity of the image is detected in the aforementioned manner by the photodetector 26. The output signal from the photodetector, in turn, is amplified by the amplifier 28 to provide an output signal, as shown at C in FIG. 3A, to one input of the comparator 30. The comparator 30, in turn, compares the output signal A with the voltage reference signal B as shown in FIG. 3A. The microprocessor 34, in turn, reacts to the output signal from the comparator 30 at the center of the vertical field where it can be seen that the voltage reference signal B exceeds the level of the output signal A from the amplifier 28. This indicates that the cathode ray tube 12 grid voltage is set too high by virtue of its being adjusted in the aforementioned manner to correlate to a 1.5 volt reference signal B.

Figure 3B:
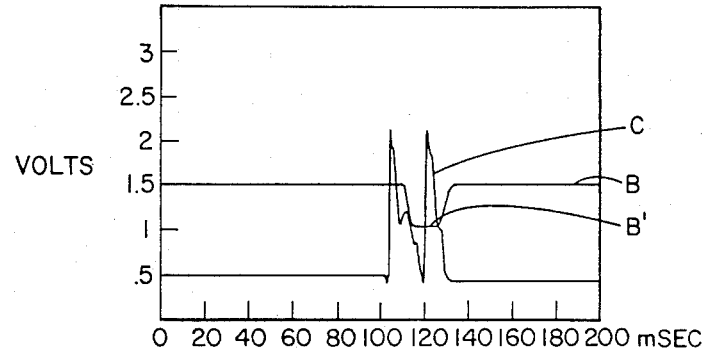

The microprocessor 34 thereafter provides a control signal to close one of the switch contacts $S_6$, $S_7$ to further reduce the voltage reference signal B level from 1.5 volts to 1 volt as graphically shown at B' in FIG. 3B. Again, the light intensity of the image displayed on the display screen 14 is detected by the photodetector 26 and converted to the amplified electronic signal as shown at C in FIG. 3B for comparison with the newly established 1 volt reference signal B'. As is readily apparent for the examples of FIGS. 3A and 3B, it can be seen that the value of the output signal C from the amplifier 28 exceeds the value of the newly established 1 volt reference signal at the center of the vertical field thereby signalling the microprocessor 34 that the grid voltage applied to the CRT 12 is correct for that scene brightness.

Figure 4A:
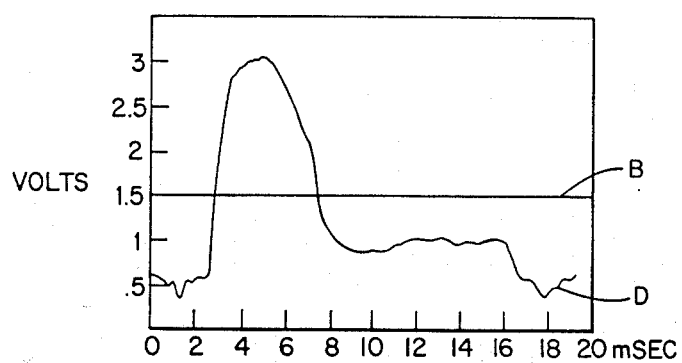
FIGS. 4A and 4B show graphical representations for different electrical signals of the circuit of FIG. 1.
Figure 4B:
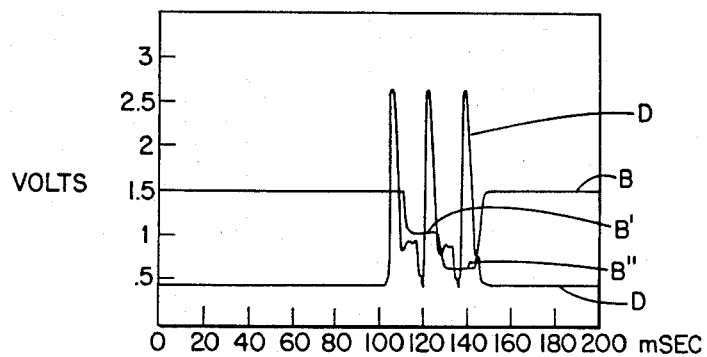

Referring now to FIGS. 4A and 4B, there is shown at D the output signal from the amplifier 28 derived from the photodiode 26 detecting the light intensity of the display screen 14 upon the application of another image defining electronic information signal. As is now readily apparent, it can be seen from FIG. 4B that dropping the 1.5 volt reference signal B, by closing one of the switch contacts $S_6$ or $S_7$, to the 1 volt reference signal B' is not sufficient to reduce the voltage reference signal B below the value at the center of the field of the output signal D from the amplifier 28. Thus, the remaining open switch contact of the switch contacts $S_6$ and $S_7$ must be closed to further reduce the voltage reference signal and thereby provide a 0.6 voltage reference signal B''. It can now be seen that the twice reduced 0.6 volt reference signal B'' exceeds the amplitude of the output signal D at the center of the field. Thus, the grid voltage to the cathode ray tube 12 provides for too dark an image and must be adjusted to brighten the image. This is accomplished by the microprocessor 34 switching the appropriate switch contacts $S_1$ through $S_5$ to decrease the resistance of the network 24 by two incremental steps of resistance thereby increasing the image brightness by 2/10ths of a stop. Had the amplitude of the output signal D at the center of the field not exceeded the twice reduced 0.6 volt reference signal B'', then the image would have to be brightened to an even greater extent such as 4/10ths of a stop which would be accomplished by the microprocessor 34 switching the appropriate switch contacts $S_1$ through $S_5$ to decrease the resistance of the network 24 by four incremental steps of resistance.

Conversely, if the output signal from the comparator 30 at the center of the vertical field indicates that the level of the output signal A from the amplifier 28 exceeds the original 1.5 volt reference signal B, then the image is too bright and must be darkened. This is accomplished by the microprocessor 34 switching the appropriate switch contacts $S_1$ through $S_5$ to increase the resistance of the network 24 by two incremental steps of resistance thereby decreasing the image brightness by 2/10ths of a stop. Thus, the grid voltage to the cathode ray tube 12 is appropriately adjusted to correspond with one olf four exposure ranges as determined by the amplitude of the output signal from the amplifier 28 as measured about the center of the field being: greater than 1.5 volts or between 1 volt and 1.5 volts or between 0.6 volts and 1 volt, or less than 0.6 volts. Although only three different voltage reference signal levels, 1.5, 1 and 0.6 volts, defining the aforementioned four exposure ranges are described, it will be generally apparent that any number of different voltage reference signal levels defining corresponding numbers of exposure ranges may be utilized to achieve the appropriate brightness level of the image displayed on the display screen 14 for photographic reproduction on the photosensitive material 22. Thus, in this manner there is provided a system for automatically adjusting the grid voltage to a cathode ray tube to achieve the appropriate image brightness required to satisfactorily expose a photosensitive material to the image displayed on the screen of the cathode ray tube. It will be readily understood, however, that although it is preferred to vary the image brightness by adjusting the grid voltage to the cathode ray tube, other methods such as varying the cathode DC voltage may also be employed.

Alternatively, it will be well understood that a color cathode ray tube could be used in place of the monochrome CRT 12 and filter wheel 16 thereby exposing the photosensitive material 22 to the full color image in a single exposure. Other embodiments of the invention, including additions, subtractions, deletions and other modifications of the preferred disclosed embodiments of the invention will be obvious to those skilled in the art and are within the scope of the following claims.

What is claimed is:

1. An electronic printer for displaying an image for photographic reproduction comprising:

display means for visually displaying the image to be photographed;

photoresponsive means for detecting the intensity of light emanating from said display means and providing an output signal corresponding to the intensity of light so detected;

comparator means for comparing the output signal from said photoresponsive means with a select one of a plurality of different voltage reference signals and providing an output signal indicative of said comparison; and control means for initially applying a steady state select voltage to said display means in place of an image defining electronic information signal so that said display means displays a substantially uniform light intensity; for thereafter adjusting, if necessary, the light intensity of said display means in response to the output of said comparator means so that the light intensity of said display means corresponds to said one select voltage reference signal; for thereafter applying an image defining electronic information signal in place of said steady state select voltage to said display means so that said display means displays the image to be photographed; for thereafter selecting, if necessary, other ones of said plurality of different voltage reference signals until the output signal from said comparator means meets a select condition; and for thereafter adjusting, if necessary, the light intensity of said display means as a function of the different voltage reference signals selected in the immediately preceding step.

2. The electronic printer of claim 1 wherein said display means comprises a cathode ray tube having cathode and grid terminals and said control means applies said steady state voltage and said image defining electronic information signal to the cathode terminal of said cathode ray tube and adjusts the light intensity of said cathode ray tube by varying the voltage applied to the grid terminal of said cathode ray tube.

3. The electronic printer of claim 2 wherein said control means comprises a first plurality of resistors and first switch means for connecting said resistors in select parallel relationship with respect to each other, said switch means being selectively controlled to vary the voltage applied to the grid terminal of said cathode ray tube.

4. The electronic printer of claim 3 wherein said control means comprises a second plurality of resistors and a second switch means for connecting said resistors in select parallel relationship with respect to each other, said switch means being selectively controlled to select one of said plurality of different voltage reference signals.

5. The electronic printer of claim 2 wherein said cathode ray tube displays a plurality of succeeding television fields and said control means responds to the output of said comparator means only about the middle of each field.

6. The electronic printer of claim 5 wherein said select condition of the output signal from said comparator means corresponds to the output signal from said photoresponsive means not exceeding the select one of said plurality of different voltage reference signals.

7. The electronic printer of claim 6 wherein said control means includes a microprocessor.

8. A method for adjusting the image brightness in a system for displaying images for photographic reproduction comprising the steps of:

applying a steady state select voltage to an image display device so that said display device displays a generally uniform light intensity;

detecting the intensity of light emanating from said display device and providing a first output signal corresponding to the intensity of light so detected;

comparing said first output signal with a select one of a plurality of different voltage reference signals and providing a second output signal indicative of said comparison;

adjusting, if necessary, the light intensity of said display means in response to said second output signal so that the light intensity of said display means corresponds to said one select voltage reference signal;

applying an image defining electronic information signal in place of said steady state select voltage to said display means so that said display means displays the image to be photographed;

selecting, if necessary, other ones of said plurality of different voltage reference signals until said second output signal meets a select condition; and adjusting, if necessary, the light intensity of said display means as a function of the different voltage reference signals selected in the immediately preceding step.

9. The method of claim 8 wherein: the display device comprises a cathode ray tube having cathode and grid terminals, said steady state voltage and said image defining electronic information signal are applied to the cathode terminal of the cathode ray tube and said adjustment to the light intensity of the cathode ray tube is accomplished by varying the voltage applied to the grid terminal of the cathode ray tube.

10. The method of claim 9 wherein the grid voltage applied to the grid terminal of the cathode ray tube is varied by switching select ones of a plurality of resistors into parallel relation with respect to each other.

11. The method of claim 10 wherein said select one of said plurality of different voltage reference signals is selected by switching select ones of a plurality of resistors into parallel relation with respect to each other.

12. The method of claim 9 wherein said cathode ray tube displays a plurality of succeeding television fields and said steps conducted in response to said second output signal are timed to respond to said second output signal only about the middle of each said field.

13. The method of claim 12 wherein said select condition of said second output signal corresponds to the output signal from said photoresponsive means not exceeding the select one of said plurality of different voltage reference signals.

* * * * *